United States Patent
Kyosti et al.

(10) Patent No.: US 11,152,717 B2
(45) Date of Patent: Oct. 19, 2021

(54) OVER-THE-AIR TEST

(75) Inventors: Pekka Kyosti, Jokirinne (FI); Petteri Heino, Oulu (FI); Janne Kolu, Kiiminki (FI); Marko Falck, Sarajarvi (FI)

(73) Assignee: Keysight Technologies Singapore (Sales) Pte. Ltd., Singapore (SG)

( * ) Notice: Subject to any disclaimer, the term of this patent is extended or adjusted under 35 U.S.C. 154(b) by 731 days.

(21) Appl. No.: 13/121,208

(22) PCT Filed: Oct. 6, 2008

(86) PCT No.: PCT/FI2008/050554
§ 371 (c)(1),
(2), (4) Date: Apr. 22, 2011

(87) PCT Pub. No.: WO2010/040887
PCT Pub. Date: Apr. 15, 2010

(65) Prior Publication Data
US 2011/0191090 A1    Aug. 4, 2011

(51) Int. Cl.
*H01Q 25/00* (2006.01)
*H01Q 21/20* (2006.01)
*H04B 17/391* (2015.01)

(52) U.S. Cl.
CPC ............ *H01Q 25/00* (2013.01); *H01Q 21/20* (2013.01); *H04B 17/3912* (2015.01)

(58) Field of Classification Search
None
See application file for complete search history.

(56) References Cited

U.S. PATENT DOCUMENTS

| | | | |
|---|---|---|---|
| 6,208,841 B1 | 3/2001 | Wallace et al. | |
| 7,031,719 B2 | 4/2006 | Miyano et al. | |
| 7,123,943 B2 * | 10/2006 | Ylitalo | H01Q 25/00 455/561 |
| 7,430,413 B2 * | 9/2008 | Fleury | H04B 7/04 342/169 |
| 7,432,856 B1 * | 10/2008 | Hornbostel et al. | 342/372 |
| 2001/0031647 A1 | 10/2001 | Scherzer et al. | |
| 2002/0068613 A1 | 6/2002 | Miyano et al. | |

(Continued)

FOREIGN PATENT DOCUMENTS

| | | |
|---|---|---|
| EP | 1482468 A2 | 12/2004 |
| JP | 11340930 A * | 12/1999 |

(Continued)

OTHER PUBLICATIONS

Turin, G.L.; Clapp, F.D.; Johnston, T.L.; Fine, S.B.; Lavry, D., "A statistical model of urban multipath propagation," in Vehicular Technology, IEEE Transactions on , vol. 21, No. 1, pp. 1-9, Feb. 1972.*

(Continued)

*Primary Examiner* — Omar F Fernandez Rivas
*Assistant Examiner* — Robert S Brock

(57) ABSTRACT

A testing system comprises an emulator having a simulated radio channel for communicating therethrough with the electronic device. The testing system comprises a plurality of antenna elements coupled to an emulator which forms a beam of a signal of a path of a simulated radio channel with at least two antenna elements of the plurality of antenna elements in an anechoic chamber.

25 Claims, 5 Drawing Sheets

(56) References Cited

U.S. PATENT DOCUMENTS

| | | | |
|---|---|---|---|
| 2003/0003883 | A1 | 1/2003 | Wallace et al. |
| 2005/0085223 | A1* | 4/2005 | Liu ............................... 455/423 |
| 2005/0267715 | A1 | 12/2005 | Kolu et al. |
| 2006/0148429 | A1* | 7/2006 | Inogai ................ H04B 17/0087 455/115.1 |
| 2006/0176993 | A1 | 8/2006 | Kwun et al. |
| 2007/0127559 | A1* | 6/2007 | Chang ................ H04B 17/0087 375/213 |
| 2007/0243826 | A1 | 10/2007 | Liu |
| 2008/0056340 | A1* | 3/2008 | Foegelle ....................... 375/224 |
| 2008/0123756 | A1* | 5/2008 | Daniels .............. H04B 17/0087 375/260 |
| 2011/0084887 | A1* | 4/2011 | Mow ...................... G01R 29/10 343/703 |
| 2011/0189962 | A1 | 8/2011 | Kyosti et al. |
| 2011/0270567 | A1* | 11/2011 | Mow .................. H04B 17/0087 702/120 |
| 2011/0299570 | A1* | 12/2011 | Reed .................... H04B 7/0434 375/130 |
| 2012/0134400 | A1* | 5/2012 | Ding .................. H04B 17/0085 375/224 |
| 2013/0006601 | A1* | 1/2013 | Mlinarsky .......... H04B 17/0087 703/23 |
| 2014/0241408 | A1* | 8/2014 | Sozanski ............ H04B 17/0087 375/224 |

FOREIGN PATENT DOCUMENTS

| | | |
|---|---|---|
| JP | H11-340930 A | 12/1999 |
| JP | 2000-209166 A | 7/2000 |
| JP | 2001004499 A | 1/2001 |
| JP | 2002021511 | 1/2002 |
| JP | 2005520400 | 7/2005 |
| JP | 2008518567 A | 5/2008 |
| JP | 2001004499 A | 3/2011 |
| KR | 100796625 | 1/2008 |
| TW | 200740143 | 10/2007 |
| TW | 200838180 | 9/2008 |
| WO | WO03077491 A1 | 9/2003 |

OTHER PUBLICATIONS

Graham Celine, Effectively testing MIMO-enabled wireless devices, Test & Measurement, Aug. 2007, 3 pages.*
Lin Guo, Can Sun, Xudong An, Xiao Zhang and Meng Yang, Over the Air MIMO Channel Model Validation, 7th European Conference on Antennas and Propagation (EUCAP 2013), pp. 1848-1852.*
Kyosti, P.; Nuutinen, J.-P.; Jamsa, T., "MIMO OTA test concept with experimental and simulated verification," in Antennas and Propagation (EuCAP), 2010 Proceedings of the Fourth European Conference on , vol. No., pp. 1-5, Apr. 12-16, 2010.*
Pekka Kyosti, Jukka-Pekka Nuutinen, Janne Kolu, Marko Falck, Channel Modelling for Radiated Testing of MIMO Capable Terminals, ICT-MobileSummit 2009 Conference Proceedings, Paul Cunningham and Miriam Cunningham (Eds) IIMC International Information Management Corporation, 2009, 9 pages.*
Suvikunnas, Pasi; Villanen, J.; Sulonen, K.; Icheln, C.; Ollikainen, J.; Vainikainen, P., "Evaluation of the Performance of Multiantenna Terminals Using a New Approach," in Instrumentation and Measurement, IEEE Transactions on , vol. 55, No. 5, pp. 1804-1813, Oct. 2006.*
English translation of abstract for JP 11340930 A, 2 pages.*
Noriyuki Ishii, Official Action for corresponding Japanese Application No. 2011-529588, pp. 1-3 (dated Nov. 14, 2012).
Official Action for corresponding Taiwan Application No. 098130533, pp. 1-4 (dated Nov. 20, 2012).
Ville Motonen, International Search Report (corresponding PCT Application No. PCT/F12008/050554) dated Jun. 12, 2009.
Christoph von Gagern, "New Wireless Technologies and OTA Measurements", COST2100 4th MCM, vol. 4th MCM TD 441, pp. 1-4 (Feb. 2008).
Michael Foegelle, "Over-the-Air Performance Testing of Wireless Devices with Multiple Antennas", URL:http://mobiledevdesign.com/ hardware_news/radio_overtheair_performance_testing/, pp. 44-52 (Feb. 2006).
Lenora Reville, Supplementary European Search Report for corresponding European Application No. EP 09 81 8841, dated Aug. 31, 2012.
English translation of Official Action issued in corresponding Japanese Application No. 2011-529589, dated Aug. 1, 2012.
European Extended Search Report, Application No. 08 805 476.2, dated Oct. 7, 2013, 6 pages.
Decision in corresponding Japanese Patent Application No. 2011-529588, dated Jul. 29, 2013, 2 pages.
Canadian Office Action, Application No. 2,739,042; dated Aug. 1, 2014; 3 pages.
English Abstract of JP2002021511, Jan. 23, 2002. 1 page.
Machine translation of JP11340930A, Dec. 10, 1999, 8 pages.
International Search Report for corresponding PCT application PCT/FI2009/050155, pp. 1-5 (dated May 2009), 5 pages.
Machine translation of TW200740143, Oct. 16, 2007. 45 pages.
Machine translation of TW200838180, Sep. 16, 2008, 114 pages.
Extended European Search Report dated Sep. 6, 2012 for European Application No. 09818841.0, 3 pages.
English translation of Office Action dated Jan. 8, 2012 for Japanese Patent Application No. 2011-529589, 2 pages.
English translation of Office Action dated May 24, 2013 for Korean Application No. 2011-7010323, 2 pages.
English translation of Office Action dated Apr. 1, 2013 for Korean Patent Application No. 2011-7010329, 1 page.
Forenza, et al., "Simplified Spatial Correlation Models for Clustered MIMO Channels With Different Array Configurations" IEEE Transactions on Vehicular Technology, vol. 56, No. 4, p. 1924-1934 (Jul. 2007).
Kildal,"Correlation and capacity of MIMO systems and mutual coupling, radiation efficiency, and diversity gain of their antennas: coupling, radiation efficiency, and diversity gain of their antennas: simulations and measurements in a reverberation chamber", IEEE Communications Magazine, vol. 42, No. 12, p. 104-122 (Dec. 2004).
Li, et al., "Cluster-Based Double Bounce MIMO Channel Model and Capacity Analysis" International Conference on Wireless Communications, Networking and Mobile Computing WiCom, Piscataway, NJ, USA, p. 153-156 (Sep. 2007).
International Search Report dated May 20, 2009 for PCT Application No. PCT/FI2009/050155, 5 pages.
Rad, et al., "The Impact of Non-Isotropic Scattering and Directional Antennas on MIMO Multicarrier Mobile Communication Channels", IEEE Transactions on Communications, vol. 56, No. 4, p. 642-652 (Apr. 2008).
Valenzuela-Valdes, et al., "Emulation of MIMO Non isotropic Fading Environments with Reverberation Chambers", IEEE Antennas and Wireless Propagation Letters, vol. 7, p. 325-328 (Jul. 2008).
Zhao, et al., "A New Spatial-Temporal Correlation Model for MIMO Channel", Proceedings of the Fifth International Conference on Machine Learning and Cybernetics, Dalian, p. 534-538 (Aug. 2006).
Written Opinion dated Jun. 10, 2009 for PCT Application No. PCT/FI2009/050155, 6 pages.
International Preliminary Report on Patentability dated Apr. 12, 2011 for PCT Application No. PCT/FI2009/050155, 7 pages.
Machine translation of JP2002021511, Jan. 23, 2002, 12 pages.
Machine translation of KR100796625, Jan. 22, 2008, 10 pages.
Office Action received for Korean Patent Application No. 2011-7010329 dated Oct. 11, 2012 (Unofficial/non-certified translation provided by foreign agent included), 8 pages.
Office Action received on Oct. 11, 2012 for Korean Application No. 2011-7010323 (Unofficial/non-certified translation provided by foreign agent included), 3 pages.
English Abstract of JP 2005-520400, published Jul. 7, 2005, 2 pages.
Office Action dated Mar. 2, 2017 in European Patent Application No. 08805476.2, 5 pages [Office Action only, art cited in Office Action previously submitted].

(56) References Cited

OTHER PUBLICATIONS

Notice of Allowance dated Jun. 15, 2017 in co-pending U.S. Appl. No. 13/121,691.

* cited by examiner

OVER-THE-AIR TEST

CROSS-REFERENCE TO RELATED APPLICATION

This application is a National Phase application of International Application No. PCT/FI2008/050554 filed Oct. 6, 2008, which is incorporated herein by reference.

BACKGROUND

Field

The invention relates to an over-the-air testing of a device in an anechoic chamber.

Description of the Related Art

When a radio frequency signal is transmitted from a transmitter to a receiver, the signal propagates in a radio channel along one or more paths having different angles of arrivals, signal delays and powers, which causes fadings of different durations and strengths in the received signal. In addition, noise and interference caused by other transmitters interfere with the radio connection.

A transmitter and a receiver can be tested using a radio channel emulator emulating real circumstances. In a digital radio channel emulator, a channel is usually modeled with a FIR filter (Finite Impulse Response filter), which generates convolution between the channel model and an applied signal by weighting the signal, delayed by different delays, with channel coefficients, i.e. tap coefficients, and by summing the weighted signal components. The channel coefficients are functions of time to correspond to the temporal behaviour of a real channel. A traditional radio channel emulator test is performed via a conducted connection such that a transmitter and a receiver are coupled together via a cable.

Communication between a subscriber terminal and a base station of a radio system can be tested using an OTA (Over The Air) test where a real subscriber terminal is surrounded by a plurality of antennas of an emulator in an anechoic chamber. The emulator which may be coupled to or act as a base station emulating paths between the subscriber terminal and the base station according to a channel model. In the test, the direction of a path depends on the direction of an antenna, and hence the directions of paths are limited and there is a need for a better OTA test solution.

SUMMARY

An object of the invention is to provide an improved method. According to an aspect of the invention, there is provided a method of communicating with an electronic device under test through a simulated radio channel of an emulator. The method further comprises forming a beam of a signal of a path of a simulated radio channel with at least two antenna elements of a plurality of antenna elements coupled to an emulator in an anechoic chamber.

According to another aspect of the invention, there is provided a testing system, the testing system comprising an emulator having a simulated radio channel for communicating therethrough with the electronic device. The testing system comprises a plurality of antenna elements couplable to an emulator; and the emulator is configured to form a beam of a signal of a path of a simulated radio channel with at least two antenna elements of the plurality of antenna elements in an anechoic chamber.

According to another aspect of the invention, there is provided a computer program product encoding a computer program of instructions for executing a computer process for communicating with an electronic device under test through a simulated radio channel of an emulator. The process comprises: forming a beam of a signal of a path of a simulated radio channel with at least two antenna elements of a plurality of antenna elements coupled to an emulator in an anechoic chamber.

The invention provides several advantages. The direction of paths may be more freely controlled, and an effect of the antenna of the DUT is included in the test. Additionally, complex radio channel scenarios can be modeled.

BRIEF DESCRIPTION OF THE DRAWINGS

In the following, the invention will be described in greater detail with reference to the embodiments and the accompanying drawings, in which.

DETAILED DESCRIPTION

Figure 1:
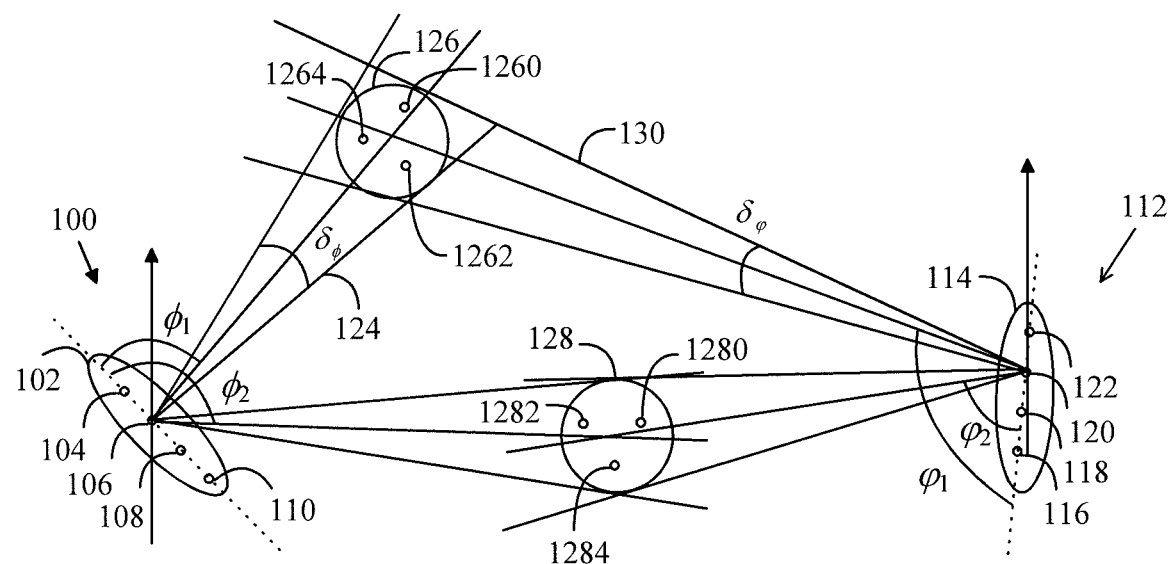
FIG. 1 illustrates a propagation of a radio signal.

FIG. 1 illustrates a propagation of a radio signal between a transmitter and a receiver. The transmitter 100 may comprise an antenna 102 of at least one antenna element 104 to 110. The antenna may be, for example, ULA (Uniform Linear Array) antenna where the spacing between the antenna elements is constant, for example half a wavelength of the radio signal. In this example, the transmitter 100 may be a base station of a radio system. Correspondingly, the receiver 112 may comprise an antenna 114 of at least one antenna element 116 to 122. In this example, the receiver 112 may be a subscriber terminal of a radio system. When the transmitter 100 transmits a radio signal, a transmission beam 124 may be directed to an angle $\varphi_1$ and its angle spread may be $\delta_\varphi$ which may be $\delta_\varphi$ which may be $x\delta_\varphi^{std}$, where x is a real number larger than zero and $\delta_\varphi^{std}$ is a standard deviation of the angle $\varphi_1$. The transmission beam 124 may hit at least one cluster 126, 128 which reflects and/or scatters the radiation. Each cluster 126, 128 may have a number of active regions 1260 to 1264, 1280 to 1286 which predominantly reflect and/scatter in the cluster 126, 128. A cluster 126, 128 may be fixed or moving, and a cluster 126, 128 may be a natural or man-made object such as a building, a train, a mountain etc. The active regions may be some finer structural features on an object.

The reflected and/or scattered beam may be directed towards the antenna 114 of the receiver 112. The antenna 114 may have a reception angle $\varphi_1$ and its angle spread may be $\delta_\varphi$ which may be $y\delta_\varphi^{std}$, where y is a real number larger than zero and $\delta_\varphi^{std}$ is a standard deviation of angle $\varphi_1$. The beam 130 reflected and/or scattered from a cluster 126 may then be received. Similarly, the antenna 114 may also have a beam from a reception angle $\varphi_2$ and its angle spread may be $\delta_{\varphi2}$. The propagation from a transmitter 100 to a receiver 112 via at least one cluster 126, 128 causes an additional delay to a signal with respect to a signal traveling straight along a line-of-sight.

Clusters 126, 128 in a radio channel are responsible for multi path propagation. It can be approximated that a path and a cluster 126, 128 have a correspondence such that one received path comes from one cluster. Hence, a radio channel may be described by cluster powers, delays, nominal AoA (Angle of Arrival) and AoD (Angle of Departure), and angle spreads of clusters at both arrival and departure ends. Additionally, information on the receiver and transmitter antenna arrays is required. The information may include values of parameters of an antenna array geometry and an antenna field pattern (beam). Also the subscriber terminal velocity vector and/or the cluster Doppler frequency component may be needed.

Table 1 presents an example of a clustered delay line model of a radio channel in an urban environment. Clusters 1 and 3 have three active regions which have different delays and powers.

TABLE 1

Non-line-of-sight clustered delay line model, urban macro-cell.

| Cluster # | Delay [ns] | Power [dB] | AoD [°] | AoA [°] |
|---|---|---|---|---|
| 1 | 0 5 10 | −3.5 −5.7 −7.5 | 6 | 29 |
| 2 | 5 | −9.2 | 44 | −98 |
| 3 | 20 25 30 | −3.0 −5.2 −7.0 | 2 | 8 |
| 4 | 45 | −7.8 | −34 | −114 |
| 5 | 265 | −3.7 | 26 | 70 |
| 6 | 290 | −8.6 | −41 | 107 |
| 7 | 325 | −2.5 | −17 | 59 |
| 8 | 340 | −7.3 | −33 | −103 |
| 9 | 355 | −3.8 | 24 | 73 |
| 10 | 440 | −6.9 | −34 | −111 |
| 11 | 555 | −8.9 | −38 | −112 |
| 12 | 645 | −9.0 | 44 | 122 |
| 13 | 970 | −9.8 | 53 | 129 |
| 14 | 1015 | −15.0 | 54 | 153 |
| 15 | 1220 | −13.4 | 53 | −145 |
| 16 | 1395 | −14.9 | 52 | −157 |
| 17 | 1540 | −16.7 | 57 | −178 |
| 18 | 1750 | −11.2 | 53 | −114 |
| 19 | 1870 | −18.2 | −54 | −160 |
| 20 | 1885 | −17.8 | −60 | −175 |

An ASD (Angle Spread of Departure) may be assumed constant for all clusters, ASD=2° in this example. Correspondingly, an ASA (Angle Spread of Arrival) may be assumed constant for all clusters, ASA=15° in this example. Additionally, XPR (Cross Polarization Power ratio) may also be assumed constant for all clusters, XPR=7 dB in this example. They may also be different for different clusters.

An impulse response estimate $H_{u,s,n}(t, \tau)$ of a radio channel may be expressed in a mathematical form as follows:

$$H_{u,s,n}(t, \tau) = \sqrt{(P_n)} \sum_{m=1}^{M} \begin{pmatrix} F_{tx,s}(\phi_{n,m})\exp(jd_s k\sin(\phi_{n,m})) \cdot \\ F_{rx,u}(\phi_{n,m})\exp(jd_u k\sin(\phi_{n,m})) \cdot \\ \exp(j(\Phi_{n,m} + 2\pi v_{n,m}t)\delta(\tau - \tau_{n,m})) \end{pmatrix}, \quad (1)$$

where $F_{tx,s}$ is a transmission antenna field pattern (i.e. transmission beam), $F_{rx,u}$ is a reception antenna field pattern (i.e. reception beam), $d_s$ is a distance between the antenna elements in a ULA transmission antenna, $d_u$ is a distance between the antenna elements in a ULA reception antenna, k is a wave number (k=2π/λ$_0$, where X$_0$ is a wavelength of the radio signal), P$_n$ means a cluster power, M means the number of active regions in a cluster, m is an index of an active region, n is an index of a cluster, $\Phi_{n,m}$ is a constant phase term of a scatterer n, m, $v_{n,m}$ is a Doppler frequency of an active region having index n,m and τ is a delay.

A Doppler frequency of an active region having index n,m can be expressed as:

$$v_{n,m} = \frac{\|\bar{v}\|\cos(\varphi_{n,m} - \theta_v)}{\lambda_0}, \quad (2)$$

where $\bar{v}$ is a velocity vector and $\|\bar{v}\|$ is a relative speed between an active region and the receiver.

The impulse response estimate in equation (1) may be simplified, when the receiver antenna is assumed omnidirectional, in the following form $$H_{s,n}(t, \tau) = \sqrt{(P_n)} \sum_{m=1}^{M} \begin{pmatrix} F_{tx,s}(\phi_{n,m})\exp(jd_s k\sin(\phi_{n,m})) \cdot \\ \exp(j(\Phi_{n,m} + 2\pi v_{n,m}t)\delta(\tau - \tau_{n,m})) \end{pmatrix}. \quad (3)$$

Figure 2:
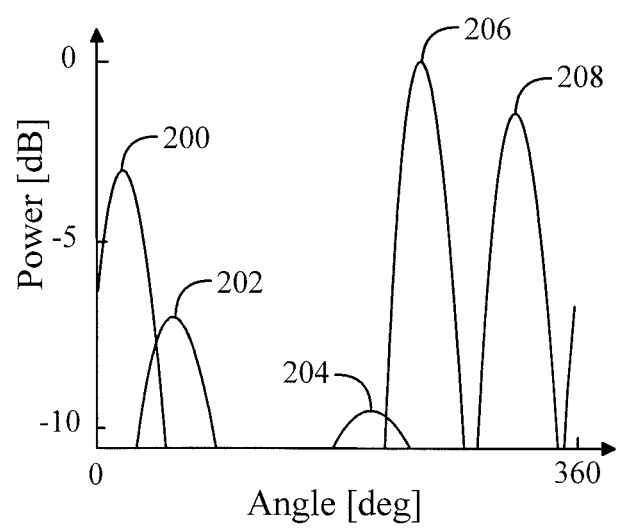
FIG. 2 illustrates a power azimuth spectrum of reception beams.

FIG. 2 illustrates a power azimuth spectrum of reception beams from five clusters. In FIG. 2 the x-axis is angle in degrees and the y-axis is power in decibels. The five beams 200, 202, 204, 206 and 208 are received at different angles of arrival. The beams 200, 202, 204, 206 and 208 may be received at different moments of time i.e. at least one of them may have a different delay with respect to the other beams.

Figure 3:
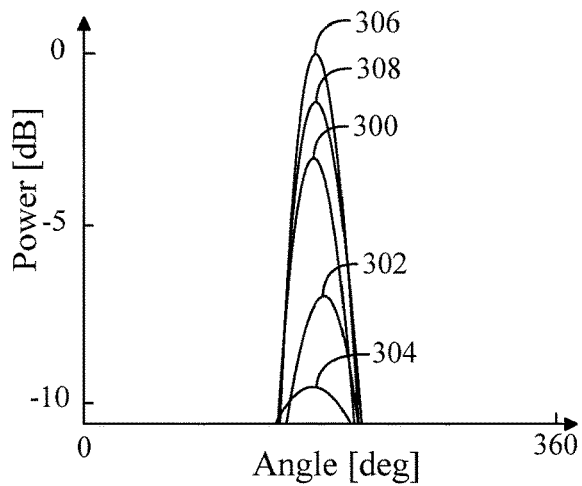
FIG. 3 illustrates a power azimuth spectrum of transmission beams.

FIG. 3 shows a power azimuth spectrum of transmission beams to the same five clusters according to the example in FIG. 2. In FIG. 3, the x-axis is angle in degrees and the y-axis is power in decibels. The five beams 300, 302, 304, 306 and 308 are transmitted at only a slightly different angles of departure since the reflecting and/or scattering clusters are only slightly dispersed in the angle.

Figure 4:
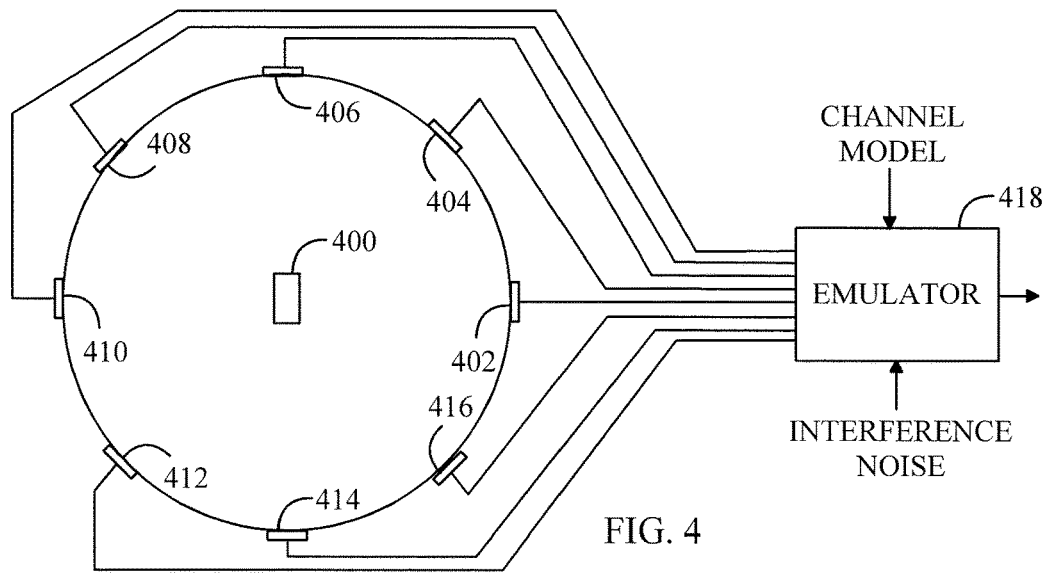
FIG. 4 shows a measurement configuration in an OTA test chamber.

FIG. 4 presents an OTA test chamber. The test chamber may be an anechoic room. A DUT 400 such as a subscriber terminal may be surrounded by antenna elements 402, 404, 406, 408, 410, 412, 414 and 416 which are coupled to an emulator 418 which may be, for example, EB (Elektrobit) Propsim® C8. The emulator 418 may comprise a processor, a memory and a suitable computer program. In this example, there are eight antenna elements in a circle separated by a constant angle of 45°. In general, there may be at least two antenna elements 402 to 416 and they may be separated from each other by a separation angle Δθ. When there are at least three antenna elements 402 to 416, the separation angle Δθ may be the same or different for any two successive antenna elements 402 to 416. The antenna elements 402 to 416 may be at the same or different distances from the DUT 400 and the antenna elements 402 to 416 may be placed only in a sector instead of a full angle or a full solid angle. The DUT 400 may also have one or more elements in the antenna.

Communicating with the DUT 400 over the air enables testing an antenna design, polarization and placement effects in such a way that path directions may be freely included in the testing. That is not possible if a cable connection is used between the emulator 418 and the DUT 400.

The emulator 418 has a channel model for the test. The channel model may be selected by a person accomplishing the test. Additionally, interference and noise may be input to the test in a desirable manner and to a desirable extent. The channel model used may be a play back model based on a recorded channel from a real radio system or it may be an artificially generated model or it may a combination of a play back model and an artificially generated model.

Assume now that the emulator 418 is coupled to or acts as a base station of a radio system and the antenna elements 402 to 416 are transmitting to the DUT 400 which acts as a receiving subscriber terminal of the radio system. It may be assumed that DUT antenna characteristics are unknown and that information may be ignored in the following example. The OTA antenna elements 402 to 416 may be assumed to be at angles $\theta_k$ of directions from the DUT, where k is 1, ..., K, where K is the number of antenna elements. The angular spacing of the antenna elements 402 to 416 may be constant $\theta_{k+1} - \theta_k = \Delta\theta$.

A geometric channel model in the emulator 418 may be mapped on the OTA antenna elements 402 to 416. The emulator 418 simulates the situation where the transmitted radiation from the base station hits clusters. The emulator 418 also forms a reflected and/or scattered beam from each cluster and divides the departure power and delay of the cluster suitably to the at least one antenna element 402 to 416. Hence, the antenna elements 402 to 416 are controlled to reproduce reflected and/or scattered beams of clusters.

Often an angle of a beam representing a reflected and/or scattered beam from a cluster differs from an angle $\theta_k$ of an antenna element 402 to 416 more than a threshold which may be, for example, 1°. Then such a beam may be transmitted using at least two antenna elements 402 to 416.

In an embodiment, the power of a simulated cluster may be divided between two antenna elements on the basis of antenna angles $\theta_k$ and a cluster angle $\varphi_n$. An angle $\theta_k$ of an antenna element k closest to a cluster angle $\varphi_n$ may be found according to the following mathematical equation $$\theta_k = \Delta\theta \operatorname{int}\left(\frac{\min_j\left(\theta_j + \frac{1}{2}\Delta\theta - \varphi_n\right)}{\Delta\theta}\right), \quad (4)$$

where min means minimum value of the expression among all values of $\theta_j$, int means an integer value of the division (including 0). The value of k is $$\operatorname{int}\left(\frac{\min_j\left(\theta_j + \frac{1}{2}\Delta\theta - \varphi_n\right)}{\Delta\theta}\right).$$

The second antenna element k+1 may then be the one having an angle $\theta_k + \Delta\theta = \theta_{k+1}$. Hence, the selected antenna elements may be those between which the beam reflected and/or scattered from a cluster at least mainly is with respect to the DUT 400.

A weight $w_{nk+i}$ for each antenna element 402 to 416 may be calculated in the following manner $$w_{nk+i} = 1 - \frac{|\theta_{k+i} - \varphi_n|}{\Delta\theta}, \quad (5)$$

where i is either 0 or 1, k is index of an antenna element closest to an angle $\varphi_n$ of a cluster n. The power $P_n$ of a cluster n to an antenna element k is multiplied by a weight $w_{n,k}$ such that $P_k + P_{k+1} = P_n$.

Assume now 8 antenna elements in a circle around a DUT, i.e. K=8 and $\Delta\theta = 45°$, a single base station antenna, a single cluster, cluster power 2, AoA $\varphi_n = 37°$. A power $P_k$ for antenna element 402 (antenna k) becomes $$P_k = P_n w_{n1}$$
$$= P_n\left(1 - \frac{|0° - 37°|}{45°}\right)$$
$$= 2.0 \cdot 0.1778$$
$$= 0.3556$$

And a power $P_{k+1}$ for antenna element 404 (antenna k+1) becomes $$P_{k+1} = P_n w_{n2}$$
$$= P_n\left(1 - \frac{|45° - 37°|}{45°}\right)$$
$$= 2.0 \cdot 0.8222$$
$$= 1.6444$$

Figure 5:
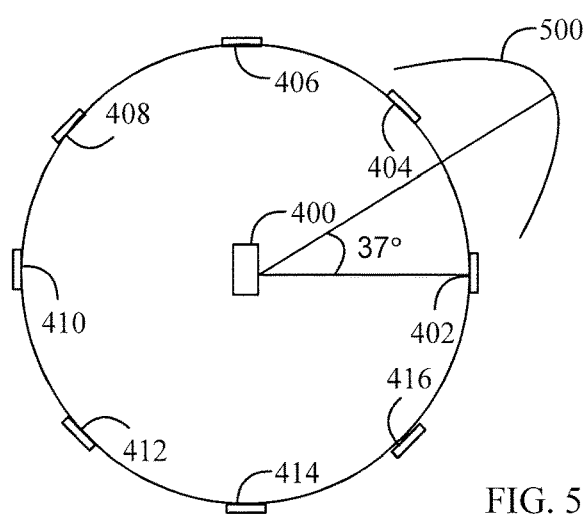
FIG. 5 shows a beam to be modeled by the antenna elements.

FIG. 5 illustrates the beam 500 formed by the antenna elements 402, 404 with the calculated power division. The signals fed to different antenna elements may also be phase shifted with respect to each other such that a directional power spectrum may be modified. The phase shifting may be performed by weighting the base band signals with suitable complex coefficients which set powers and relative delays of the signals. The phase shifting may also be performed by delaying the radio frequency signals with respect to each other. For example, desired delays may be selected suitably from a bank of digital delays (for example digital finite impulse response filter structure). Different beams of different paths of the simulated radio channel may be formed at different moments of time. A beam of a path of the simulated radio channel may be formed at different moments of time. A plurality of different beams of different paths of the simulated radio channel may be formed at a moment of time.

Figure 6:
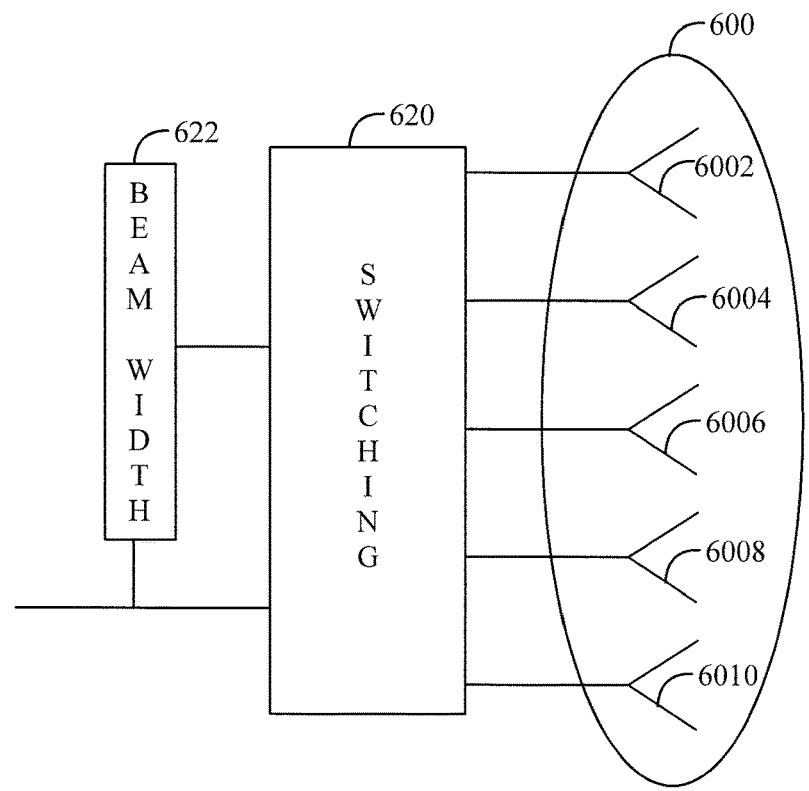
FIG. 6 shows a group of antenna elements and associated antenna group switching network.

FIG. 6 presents a group 600 of antenna elements. In an embodiment, the antenna may comprise at least one group 600 of antenna elements 6002, 6004, 6006, 6008, 6010. Hence, in place of the antenna element 402, for example, there may not only be one antenna element but several elements 6002, 6004, 6006, 6008, 6010. Each antenna element 402 to 416 may comprise, for example, five elements. In general, in place of an antenna element 402 to 416 there may be a group 600 of at least two antenna elements 6002, 6004, 6006, 6008, 6010.

A mapping to OTA antenna elements may be more simple and more accurate if a single OTA antenna element is replaced by a group 600 of antenna elements 6002, 6004, 6006, 6008, 6010. Assume that a group comprises G antenna elements 6002, 6004, 6006, 6008, 6010.

The number of elements 6002, 6004, 6006, 6008, 6010 to be fed in each antenna group 600 may be selected on the basis of a channel model arrival (per cluster) azimuth spread. Each group may be fed by a single emulator output port, and antenna elements 6002, 6004, 6006, 6008, 6010 of each group may be connected to the emulator with a switching network 620 which may comprise at least one splitter, combiner, attenuator and/or phase shifter. In an embodiment, the switching (i.e. selection of antenna elements) may be similar for all groups and it may to be done only once per measurement.

On the basis of the signal from the emulator a beam controller 622 may control how many antenna elements of a group are needed for a beam. In general, any positive integer number of antenna elements up to the maximum may be used.

In an embodiment, an odd number of elements may be used. For example, with G=5 choices may be one, three or five elements, depending on the scenario of the channel model. If there are narrow clusters in the channel model, three elements may be enough for the beam. If the clusters are wider, maximum number of elements may be used for the beam.

The selection of antenna elements in a group may be expressed in a mathematical form as follows:

$$Z' = \min_{Z}\left(\text{round}\left(\frac{\delta_\varphi}{\Delta\theta/G}\right) \leq Z\right), \quad (6)$$

where Z=G−2j and j is 0, ... , (G−3)/2, round means rounding to a closest integer value of the division (the minimum value is 1).

A mapping of the channel model to an OTA antenna may be performed by applying the following rules. Set each of the clusters to appropriate emulator channels and OTA antenna elements depending on a nominal direction of a cluster. Selection of the OTA antenna elements for a cluster n may be made by taking closest OTA antenna group centre $\theta_k$ for a nominal AoA $\varphi_n$ of a cluster. Select the number of antenna elements, for example Z', within a group by a switch 622.

Figure 7:
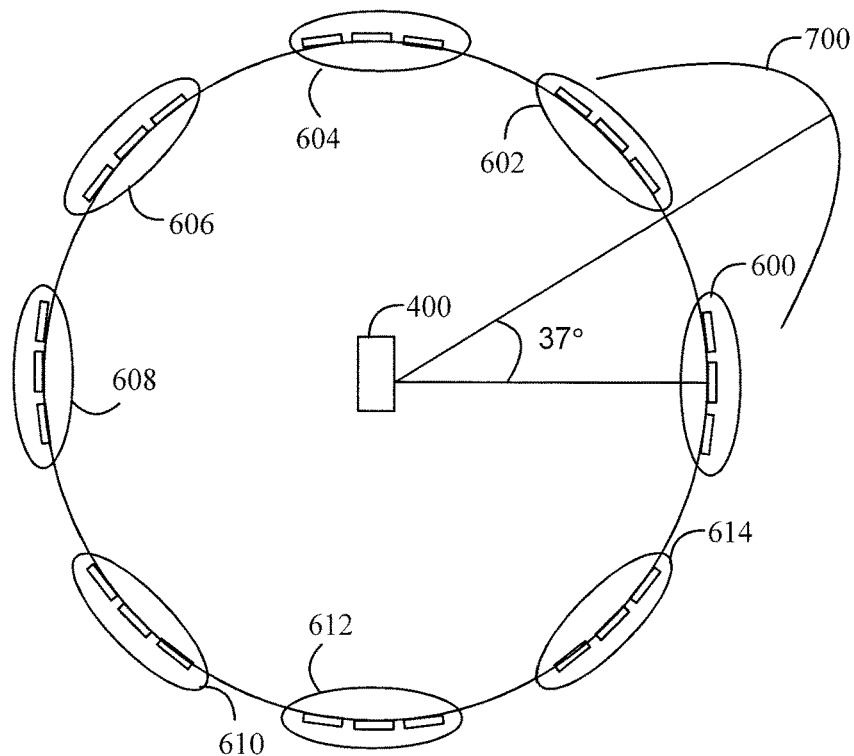
FIG. 7 shows a DUT surrounded by groups of antenna elements.

FIG. 7 presents a DUT 400 surrounded by groups 600 to 614 of antenna elements. In this example, each group 600 to 614 has three antenna elements. A beam 700 may be formed using a group 602. With eight groups and five elements in each group a full circle may be covered with uniformly located antenna elements. If a cluster is extremely wide requiring a very wide beam, for example wider than Δθ, the cluster may be mapped to more than one antenna group.

Several groups may also be used to form a beam. The groups may be applied in the same manner as what is described relating to equations (4) and (5) for selecting two antenna elements. Then, instead of selecting two antenna elements, two groups of antenna elements may be selected for a beam. In FIG. 7, a beam 700 may be formed using groups 600 and 602.

In an embodiment, fixed weights may be implemented for antenna elements such that, for example, Gaussian or Laplacian shaped cluster power azimuth spectrum can be replicated.

A reception using at least two antenna elements is performed in a corresponding manner. Hence, the method may be applied in both uplink and downlink. Assume now that the antenna elements 402 to 416 are receiving signals from the DUT 400. Signals received by the at least two antenna elements 402 to 416 may be combined in the emulator 418 for forming a reception beam of a signal of a path of a simulated radio channel. The combining may comprise weighting the power from the two antenna elements or group of antenna elements using weights $w_{nk+i}$ calculated in equations (4) and (5). Additionally, the shape and direction of the beam may be weighted using complex coefficients or another sort of phase shifting.

Figure 8:
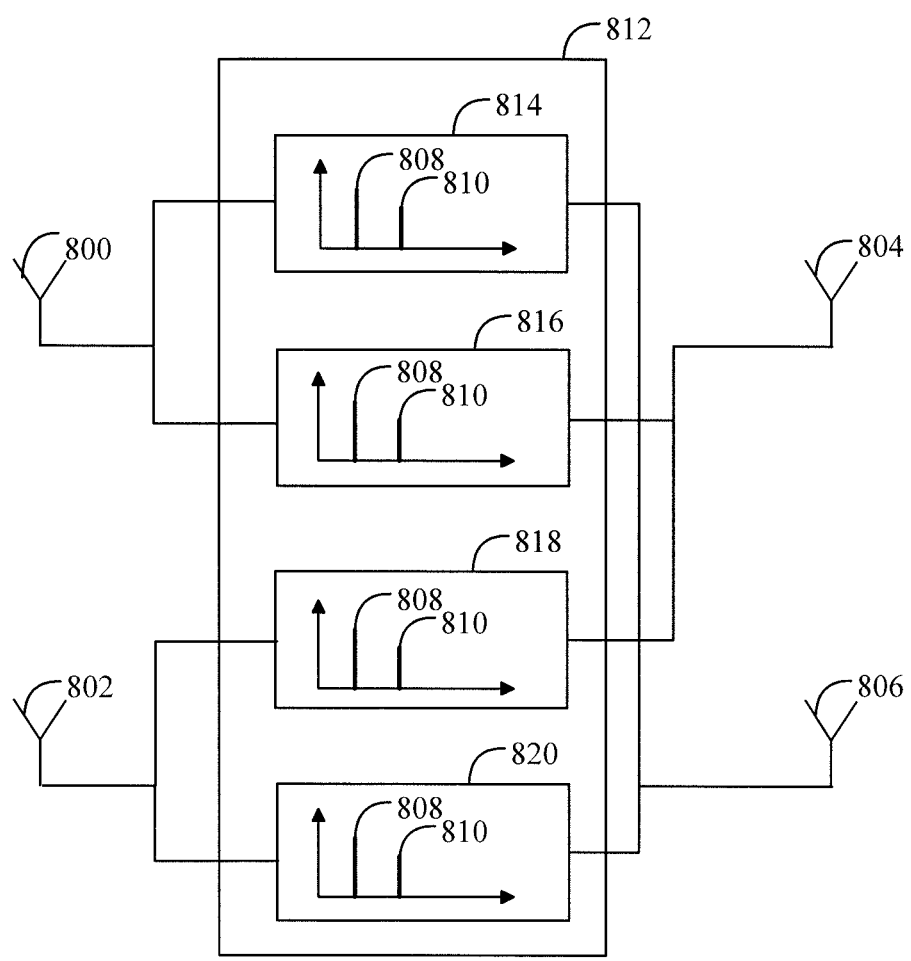
FIG. 8 presents controlling delays of antennas in a MIMO configuration.

The embodiments may be applied in 3GPP (Third Generation Partnership Project) LTE (Long Term Evolution), WiMAX (Worldwide Interoperability for Microwave Access), Wi-Fi and/or WCDMA (Wide-band Code Division Multiple Access). In the MIMO (Multiple In Multiple Out) which is also a possible application, signals are divided to antenna elements in a different manner with respect to the present embodiments. FIG. 8 shows a MIMO configuration having two transmit antenna elements 800, 802 and two receive antenna elements 804, 806. There are two delay taps 808, 810 representing different paths in delay elements 814 to 820 of an emulator 812. Signals from each transmit antennas 800, 802 are fed to delay elements 814 to 820 delaying the signals with the same delays (taps 808, 810). The outputs of delay elements 814 and 820 which delay with both delays (taps 808, 810) are combined and fed to the antenna element 806. Correspondingly, the outputs of delay elements 816 and 818 which also delay with both delays (delay taps 808, 810) are combined and fed to the antenna element 804.

Figure 9:
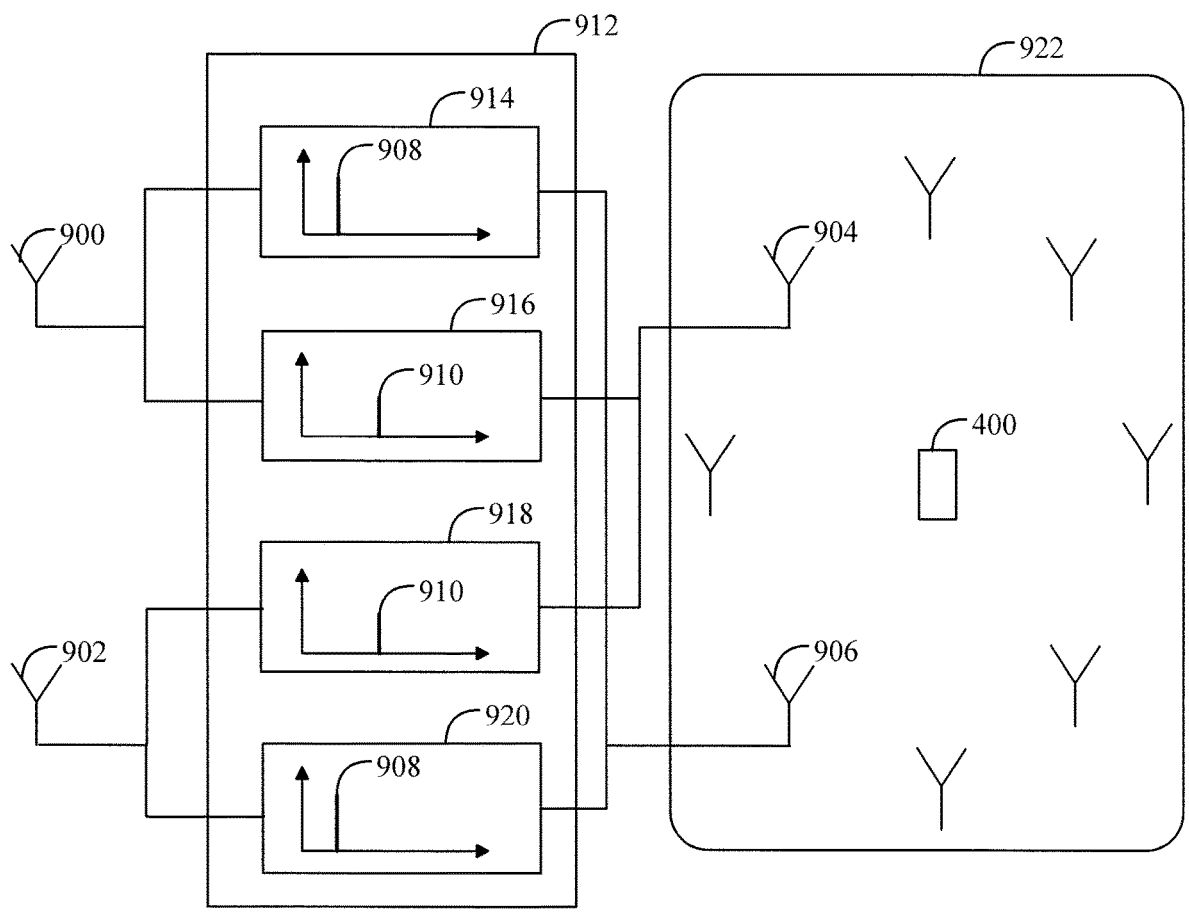
FIG. 9 presents controlling delays of antennas in an OTA chamber.

FIG. 9 shows an example of a present embodiment. Also in this example there are two transmit antenna elements 900, 902 and two receive antenna elements 904, 906 of a plurality of antenna elements in an anechoic chamber 922 of the OTA test. There are two delay taps 908, 910 representing different paths in delay elements 914 to 920 of an emulator 912. A signal from a transmit antenna 900 is fed to delay elements 914, 916. The delay element 914 delays the signal with a delay corresponding to the delay tap 908 and the delay element 916 delays the signal with a delay corresponding to the delay tap 910.

A signal from a transmit antenna 902 is fed to delay elements 918, 920. The delay element 918 delays the signal with a delay corresponding to the delay tap 910 and the delay element 920 delays the signal with a delay corresponding to the delay tap 908. The outputs of delay elements 914 and 920 which delay with the same delay (delay tap 908) are combined and fed to the antenna element 906. Correspondingly, the outputs of delay elements 916 and 918 which delay with the same delay (delay tap 910) are combined and fed to the antenna element 904. Hence, different delay taps are fed to different antenna elements 904, 906 if they represent a different AoA.

Figure 10:
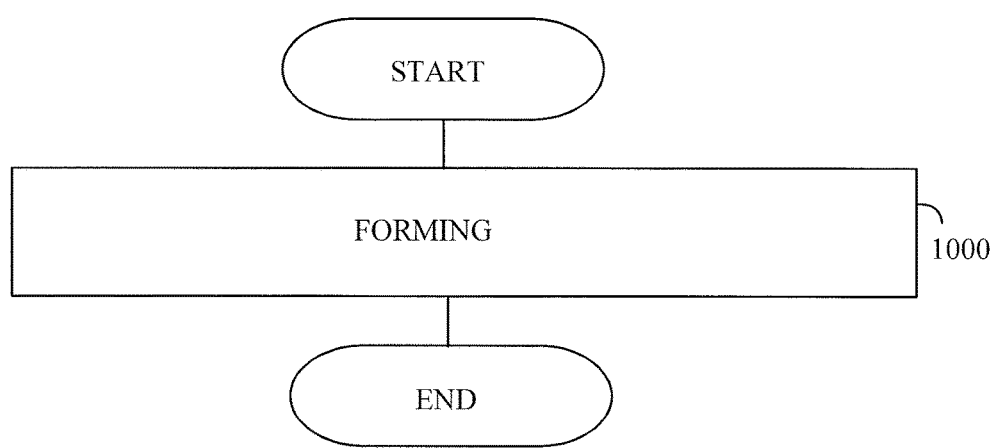
FIG. 10 shows a flow chart of a method.

FIG. 10 presents a flow chart of the method. In step 1000, a beam of a signal of a path of a simulated radio channel is formed with at least two antenna elements of a plurality of antenna elements coupled to an emulator in an over-the-air chamber.

The embodiments may be implemented, for instance, with ASIC or VLSI circuits (Application Specific Integrated Circuit, Very Large Scale Integration). Alternatively or additionally, the embodiments of method steps may be implemented as a computer program comprising instructions for executing a computer process for communicating with an electronic device under test through a simulated radio channel of an emulator. The emulator may control on the basis of the electronic circuits and/or the computer program the use of the antenna elements and the formation of beams in the anechoic chamber.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

What is claimed is:

1. A method of communicating with an electronic device under test through a simulated radio channel of an emulator, the method comprising:
    forming a single beam of a single signal of a single path of a single simulated radio channel a using plurality of antenna elements coupled to an emulator in an anechoic chamber, the emulator comprising a plurality of delay elements coupled to a same one of the plurality of antenna elements, wherein power of a simulated cluster is divided between two of the plurality of antenna elements on the basis of antenna angles $\theta_k$ and a cluster angle $\varphi_n$.

2. The method of claim 1, the method further comprising dividing a signal of a path of the radio channel to at least two antenna elements for a transmission beam.

3. The method of claim 1, the method further comprising receiving by the at least two antenna elements and combining signals of the at least two antenna elements for forming a reception beam of a signal of a path of a simulated radio channel.

4. The method of claim 1, the method further comprising forming different beams of different paths of the simulated radio channel at different moments of time.

5. The method of claim 1, the method further comprising forming a beam of a path of the simulated radio channel at different moments of time.

6. The method of claim 1, the method further comprising forming a plurality of different beams of different paths of the simulated radio channel at a moment of time.

7. The method of claim 1, the method further comprising searching for two antenna elements between angles of which an angle of a direction of a path is and forming the beam using the two antenna elements.

8. The method of claim 1, the method further comprising forming the beam by a group of antenna elements including an odd number of antenna elements.

9. A testing system, the testing system comprising:
    an emulator having a simulated radio channel for communicating therethrough with an electronic device; and
    a plurality of antenna elements couplable to the emulator, the emulator comprising a plurality of delay elements coupled to a same one of the plurality of antenna elements;
    the emulator being configured to form a single beam of a single signal of a sine path of a single simulated radio channel using at least two antenna elements of the plurality of antenna elements in an anechoic chamber, wherein power of a simulated cluster is divided between two of the plurality of antenna elements on the basis of antenna angles $\theta_k$ and a cluster angle $\varphi_n$.

10. The testing system of claim 9, wherein the emulator is configured to divide a signal of a path of the radio channel to at least two antenna elements for a transmission beam.

11. The testing system of claim 9, wherein the emulator is configured to receive by the at least two antenna elements and combining signals of the at least two antenna elements for forming a reception beam of a signal of a path of a simulated radio channel.

12. The testing system of claim 9, wherein the emulator is configured to form different beams of different paths of the simulated radio channel at different moments of time.

13. The testing system of claim 9, wherein the emulator is configured to form a beam of a path of the simulated radio channel at different moments of time.

14. The testing system of claim 9, wherein the emulator is configured to form a plurality of different beams of different paths of the simulated radio channel at a moment of time.

15. The testing system of claim 9, wherein the emulator is configured to search for two antenna elements between whose angles an angle of a direction of a path is and forming the beam using the two antenna elements.

16. The testing system of claim 9, wherein the emulator is configured to form the beam by a group of antenna elements including an odd number of antenna elements.

17. A non-transitory computer-readable medium storing instructions that, when executed by a processing device, perform a computer process to communicate with an electronic device under test through a simulated radio channel of an emulator, wherein the process comprises:
    forming a single beam of a single signal of a single path of a single simulated radio channel using a plurality of antenna elements coupled to an emulator in an anechoic chamber, the emulator comprising a plurality of delay elements coupled to a same one of the plurality of antenna elements, wherein power of a simulated cluster is divided between two of the plurality of antenna elements on the basis of antenna angles $\theta_k$ and a cluster angle $\varphi_n$.

18. The non-transitory computer-readable medium of claim 17, the process further comprising dividing a signal of a path of the radio channel to at least two antenna elements for a transmission beam.

19. The non-transitory computer-readable medium of claim 17, the process further comprising receiving by the at least two antenna elements and combining signals of the at least two antenna elements for forming a reception beam of a signal of a path of a simulated radio channel.

20. The non-transitory computer-readable medium of claim 17, the process further comprising forming different beams of different paths of the simulated radio channel at different moments of time.

21. The non-transitory computer-readable medium of claim 17, the process further comprising forming a beam of a path of the simulated radio channel at different moments of time.

22. The non-transitory computer-readable medium of claim 17, the process further comprising forming a plurality of different beams of different paths of the simulated radio channel at a moment of time.

23. The non-transitory computer-readable medium of claim 17, the process further comprising searching for two antenna elements between whose angles an angle of a direction of a path is and forming the beam using the two antenna elements.

24. The non-transitory computer-readable medium of claim 17, the process further comprising forming the beam by a group of antenna elements including an odd number of antenna elements.

25. The non-transitory computer-readable medium of claim 17, wherein the non-transitory computer-readable medium is distributed in a distribution medium including at least one of the following media: a computer readable medium, a program storage medium, a record medium, a computer readable memory, a computer readable software distribution package, a computer readable signal, a computer readable telecommunications signal, and a computer readable compressed software package.

\* \* \* \* \*